United States Patent [19]
Lim

[11] Patent Number: 6,034,729
[45] Date of Patent: Mar. 7, 2000

[54] MONITOR PROTECTION SYSTEM

[75] Inventor: Joon-Woo Lim, Suwon, Rep. of Korea

[73] Assignee: SamSung Electronics Co., Ltd., Suwon, Rep. of Korea

[21] Appl. No.: 08/953,289

[22] Filed: Oct. 17, 1997

[30] Foreign Application Priority Data

Oct. 17, 1996 [KR] Rep. of Korea ...................... 96/46521

[51] Int. Cl.[7] .............................. H04N 5/68; H04N 3/20; H01J 29/70; G09G 1/04

[52] U.S. Cl. ......................... 348/377; 348/378; 348/173; 348/377; 348/380; 315/411; 315/386

[58] Field of Search ................................. 348/377, 378, 348/379, 380, 381, 382, 818, 173; 345/13, 14, 15; 315/364, 129, 119, 411, 386, 387, 388, 389

[56] References Cited

U.S. PATENT DOCUMENTS

| | | | |
|---|---|---|---|
| 4,459,517 | 7/1984 | Hicks | 315/408 |
| 4,654,717 | 3/1987 | Stoughton | 358/243 |
| 4,749,919 | 6/1988 | Beaumont et al. | 315/386 |
| 5,047,698 | 9/1991 | Fernsler et al. | 315/411 |
| 5,671,017 | 9/1997 | Chujo | 348/378 |

Primary Examiner—John K. Peng
Assistant Examiner—Paulos M. Natnael
Attorney, Agent, or Firm—Robert E. Bushnell, Esq.

[57] ABSTRACT

A monitor protection system comprise a display power management signaling (DPMS) operating unit for performing a predetermined power control; a horizontal deflection detecting circuit for detecting a horizontal deflection signal from a horizontal deflection circuit; a vertical deflection detecting circuit for detecting a vertical deflection signal from a vertical deflection circuit; and a control circuit for determining whether the horizontal deflection signal and the vertical deflection signal are normal, and generating a predetermine control signal to run the DPMS operating unit in order to observe the conditions of horizontal/vertical synchronization signals continuously, and protect a CRT monitor independently from the horizontal/vertical synchronization input conditions.

15 Claims, 6 Drawing Sheets

MONITOR PROTECTION SYSTEM

CLAIM FOR PRIORITY

This application makes reference to, incorporates the same herein, and claims all benefits accruing under 35 U.S.C. §119 from an application for A MONITOR PROTECTION SYSTEM AND A CONTROL METHOD THEREOF earlier filed in the Korean Industrial Property Office on the 17$^{th}$ of October 1996, and there duly assigned Ser. No. 46521/1996, a copy of which application is annexed hereto.

BACKGROUND OF THE INVENTION

1. Technical Field

The present invention relates to a monitor, and particularly, to a monitor protection system and a control process of protecting a cathode-ray tube (CRT) monitor from a transient synchronization signal and an abnormal voltage generated from deflection circuits.

2. Related Art

Generally, a display device such as a CRT type of monitor, which is used as either a television monitor or a peripheral device of a computer system, processes information data received from an information data system and provides a visual display of processed information data on a screen. Such a monitor is available in either black and white known as monochrome monitor or high resolution color known as color graphics adapter (CGA), video graphics adapter (VGA) and enhanced graphics adapter (EGA) monitor. Monochrome, CGA, EGA monitors provide a visual display of graphics data by processing digital signals. VGA monitors, by contrast, provide a visual display of graphics data by processing analog signals. In all display devices, the video signal is typically received from a video card installed in an information data system in accordance with vertical and horizontal synchronization signals for a visual display.

Conventional monitor as disclosed, for example, in U.S. Pat. No. 5,072,161 for Deflection Yoke, A Deflection Device And A Monochrome CRT Display issued to Ikeda et al., generally includes a processor which receives the vertical and horizontal synchronization signals to control the visual display of information data on a screen, and vertical and horizontal deflection circuits which respectively receives the vertical and horizontal synchronization signals to perform vertical and horizontal deflection, such that an electron beam generated from an electron gun of a CRT is deflected in a regular sequence from an upper left portion to a lower right portion of the CRT by way of a deflection yoke in order to form an image. Using high voltage technology, a high voltage generating circuit such as disclosed, for example, in U.S. Pat. No. 5,438,245 for High Voltage Generating Circuit issued to Kii et al., is included to stably supply a high voltage to an anode of the CRT for forming an image in response to a flyback pulse generated from the horizontal deflection circuit. A video amplifier then serves to amplify video signals R, G and B transmitted from the video card to approximately 40 Vpp–60 Vpp for providing energy to each picture.

In such a CRT monitor, deflection circuits perform either an electrostatic deflection using an electric field or an electromagnetic deflection using a magnetic field. As a result, an image is formed on the CRT type of monitor from the electron beam projected onto a fluorescent surface thereof and by flowing a toothed waveform of electric current into horizontal and vertical coils using the electromagnetic deflection. However, the deflection circuits are prone to malfunctions, and as a result, excessive voltage is often applied to the CRT monitor causing the monitor to break down. In addition, if excessive synchronization signals are supplied to the CRT monitor, the deflection circuits generate an abnormal deflection signal to the CRT monitor causing the monitor to operate abnormally.

Contemporary techniques for protecting the CRT monitor against excessive voltage are disclosed, for example, U.S. Pat. No. 4,123,166 for High Voltage Protection Circuit issued to Watanabe, U.S. Pat. No. 4,335,335 for Television Receiver High Voltage Protection Circuit issued to Willis, U.S. Pat. No. 4,343,028 for Television Receiver High Voltage Generator Protection Circuit issued to Hicks, U.S. Pat. No. 4,345,275 for High Voltage Protection Circuit For A Television Receiver issued to Waybright, U.S. Pat. No. 4,389,676 for Television Receiver High Voltage Protection Circuit issued to Balaban et al., U.S. Pat. No. 4,459,517 for Horizontal Output Transistor Protection Circuit issued to Hicks, U.S. Pat. No. 4,544,954 for Television Receiver With High Voltage Protection Circuit issued to Chen, U.S. Pat. No. 4,788,618 for High Voltage Protecting Circuit issued to Kimura, U.S. Pat. No. 4,965,496 for Protection Arrangement Of A Deflection Circuit issued to Haferl, U.S. Pat. No. 5,111,122 for Video Display High Voltage Protection Circuit issued to Wilber, U.S. Pat. No. 5,255,147 for Vertical Yoke Protection Circuit issued to Oh, and U.S. Pat. No. 5,430,596 for CRT Protector Circuit issued to Hamaguchi et al. Generally, the excessive voltage which causes abnormal operation of the CRT monitor is detected to ensure normal operation of the deflection circuits.

Recent techniques for protecting operation of a CRT monitor use a micro-processor to detect the abnormal state of horizontal/vertical synchronization signals and a display power management signaling (DPMS) operating system to protect the CRT monitor and the deflection circuits. I have observed, however, that the CRT monitor is still prone to abnormality because the micro-processor cannot reliably determine the normality of deflection signals applied to the CRT monitor. As a result, the CRT monitor may still be damaged due to spot phenomena, etc.

SUMMARY OF THE INVENTION

Accordingly, it is therefore an object of the present invention to provide a monitor protection system of a CRT monitor having a simplified circuit construction.

It is also an object to provide a monitor protection system of a CRT monitor capable of detecting an abnormal state of deflection signals and reliably protecting the CRT monitor from occurrence of the abnormal state of deflection signals.

It is another object to provide a monitor protection system of a CRT monitor capable of continuously monitoring conditions of horizontal/vertical synchronization signals, and protecting the CRT monitor independently from the horizontal/vertical synchronization conditions.

These and other objects of the present invention can be achieved by a monitor protection system for a CRT monitor which includes a DPMS operating system for performing a predetermined power control; a horizontal deflection detecting circuit for detecting a horizontal deflection signal from a horizontal deflection circuit; a vertical deflection detecting circuit for detecting a vertical deflection signal from a vertical deflection circuit; and a control circuit for determining whether the horizontal deflection signal and the vertical deflection signal are normal, and generating a predetermine control signal to run the DPMS operating system.

The horizontal deflection detecting circuit comprises a first horizontal divided voltage resistor connected to an output terminal of the horizontal deflection circuit to force the horizontal deflection signal to be divided into a first voltage, a second horizontal divided voltage resistor connected between the first horizontal divided voltage resistor and ground to force the horizontal deflection signal to be divided into a second voltage, and a horizontal Zener diode connected between the first and second horizontal divided voltage resistors and ground to force the second voltage to be maintained at a predetermined voltage, wherein an output signal divided by the first and second horizontal divided voltage resistors is set at 5 Volts.

The vertical deflection detecting circuit comprises a first vertical divided voltage resistor connected to an output terminal of the vertical deflection circuit to force the vertical deflection signal to be divided into a first voltage; a second vertical divided voltage resistor connected between the first vertical divided voltage resistor and ground to force the vertical deflection signal to be into a second voltage; and a vertical Zener diode connected at one terminal between the first and second divided voltage resistors and grounded at other terminal to force the second voltage to be maintained at a predetermined voltage.

The control circuit controls the monitor protection system to protect the CRT from abnormality by first reading a horizontal deflection detecting signal from a horizontal deflection detecting circuit, determining whether the horizontal deflection detecting signal normal, reading a vertical deflection detecting signal from a vertical deflection detecting circuit, determining whether the vertical deflection detecting signal is normal, and then generating a protection control signal to force a DPMS operating system to protect the CRT from abnormality.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
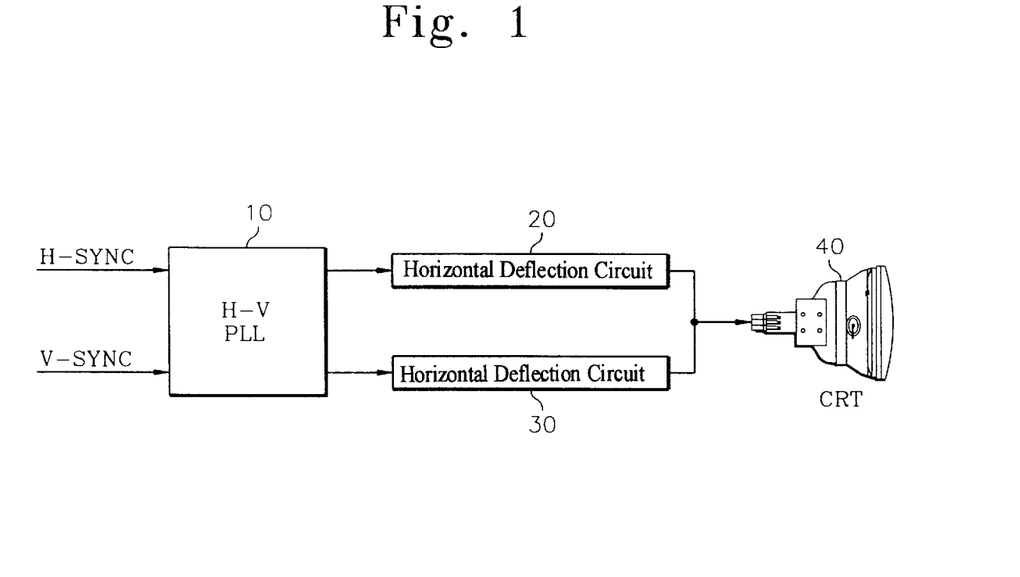
FIG. 1 is a schematic block diagram of typical deflection circuits of a CRT monitor.

Referring now to the drawings and particularly to FIG. 1, which illustrates a contemporary monitor deflection circuit for a CRT monitor. The monitor deflection circuit includes a horizontal/vertical phase locked loop (PLL) 10, a horizontal deflection circuit 20, a vertical deflection circuit 30, and a CRT 40.

The horizontal/vertical PLL 110 receives horizontal and vertical synchronization signals H_SYNC and V_SYNC to multiply the input synchronization signals at a predetermined frequency under the condition that the input synchronization signals and the feedback signals are maintained at the same phase to each other. Then, the horizontal deflection circuit 20 and the vertical deflection circuit 30 control the horizontal and vertical deflection operations of a CRT 40 based on the horizontal and vertical synchronization signals in such a way that an electron beam generated from an electron gun of a CRT 40 is deflected in regular sequence from an upper left portion to a lower right portion of the CRT 40 by means of a deflection yoke DY to thereby form an image. By using principle of a switching circuit and a high voltage technology, a high voltage circuit (not shown) may utilize a flyback pulse generated from the horizontal deflection circuit 20 to thereby provide a high voltage to an anode of the CRT 40. Video signals received for a visual display on the screen of the CRT 40 are then amplified to a predetermined voltage level, typically at 40 Vpp to 60 Vpp for providing energy to each picture.

In such a CRT monitor, horizontal and vertical deflection circuits perform either an electrostatic deflection using an electric field or an electromagnetic deflection using a magnetic field. As a result, an image is formed on the CRT type of monitor from the electron beam projected onto a fluorescent surface thereof and by flowing a toothed waveform of electric current into horizontal and vertical coils using the electromagnetic deflection.

As described earlier, however, typical CRT monitor has a number of problems in that when an abnormal state of deflection signals occurs due to the loss or malfunction of deflection circuits, excessive high voltage is applied to the CRT, causing the CRT to break down. In addition, if the synchronization signals are supplied excessively to the CRT, the deflection circuits generate an abnormally high voltage deflection signal to the CRT, thereby resulting in an abnormal operation.

While there are a number of traditional techniques that require complex circuitry for protecting the CRT monitor from abnormality and excessive voltage, a more contemporary practice for protecting operation of a CRT monitor use a micro-processor to detect the abnormal state of horizontal/vertical synchronization signals and a display power management signaling (DPMS) operating system to protect the CRT monitor and the deflection circuits. I have observed, however, that the CRT monitor is still prone to abnormality because the micro-processor cannot reliably determine the normality of deflection signals applied to the CRT monitor. As result, the CRT monitor may still be damaged due to spot phenomena, etc.

Figure 2:
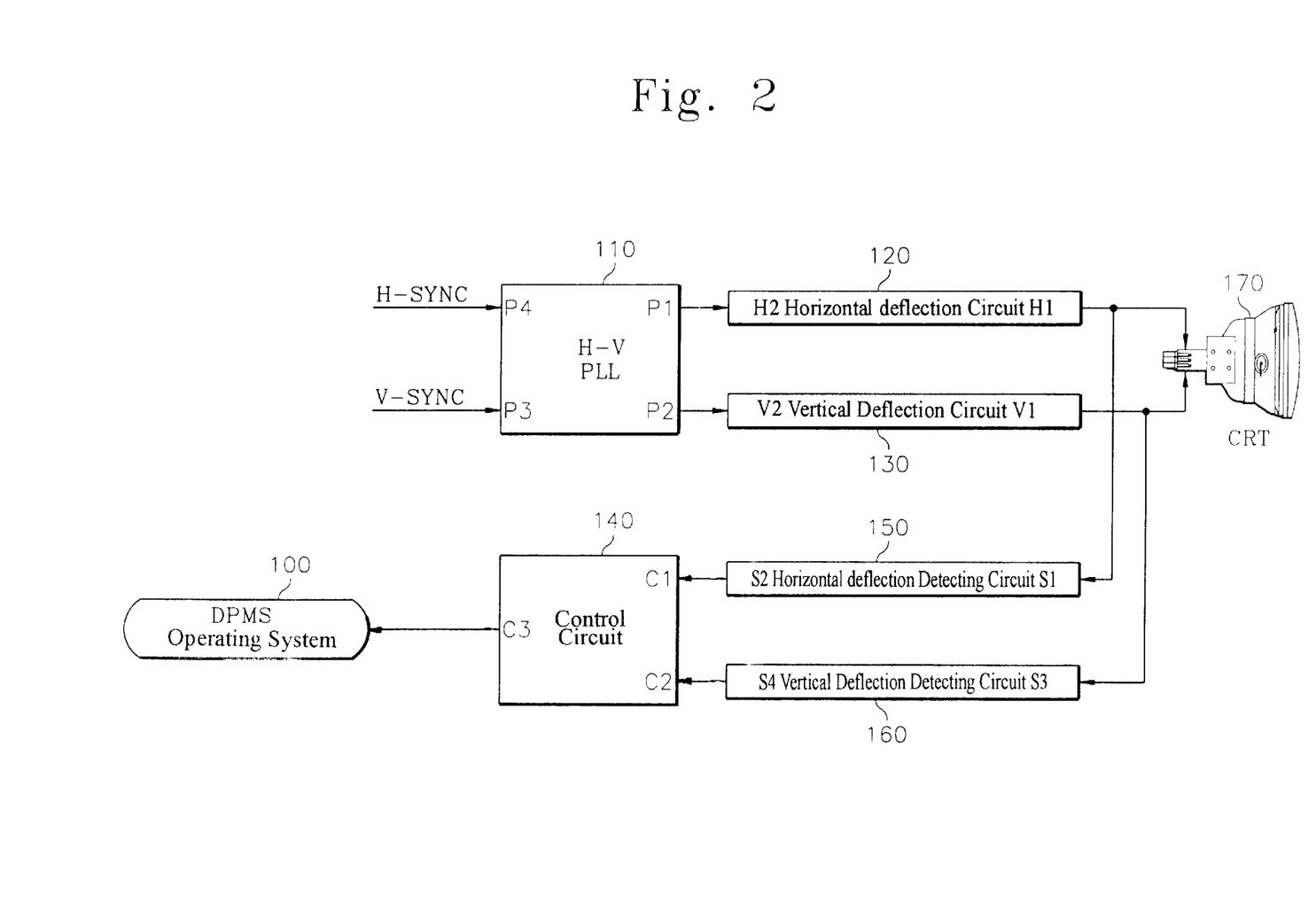
FIG. 2 is a schematic block diagram of a monitor protection system of a CRT monitor constructed according to the principles of the present invention.

Turning now to FIG. 2, which illustrates a monitor protection system for providing reliable protection of a CRT monitor constructed according to the principles of the present invention. The monitor protection system includes a DPMS operating system 100, a horizontal/vertical PLL 110, a horizontal deflection circuit 120, a vertical deflection circuit 130, a horizontal deflection detecting circuit 150, a vertical deflection detecting circuit 160 and a control circuit 140 to detect the abnormal state of deflection signals and cutting off the input synchronization signals if the abnormal state is detected.

When the horizontal deflection circuit 120 is in an abnormal state, the monitor protection system operates to reliably protect the CRT monitor from the abnormality as follows.

The horizontal deflection circuit 120 applies a horizontal deflection signal to the input terminal S1 of a horizontal deflection detecting circuit 150. The horizontal deflection detecting circuit 150 determines whether the horizontal deflection signal is input thereto and outputs an abnormal state detecting signal through an output terminal S2 to the input terminal C1 of the control circuit 140. Subsequently, the control circuit 140 determines whether the abnormal state detecting signal is input and applies a control signal through a control signal such as a logic signal of a low level "0" to the output terminal C3 of a DPMS operating system 100, if the abnormal state detecting signal is input. The DPMS operating system 100 starts the DPMS operation upon receipt of the protection control signal. The DPMS operating system is a power save circuit that is constructed in compliance with VESA standardization to manage the power supply at a power-on mode, a stand-by mode, a suspend mode or a power-off mode. Therefore, when the DPMS operating system 100 is operated in the stand-by mode or the power-off mode, the voltage to be supplied to the horizontal deflection circuit 120 is dropped. This prevents the breakdown of the horizontal deflection circuit caused by a surge current, and protects the CRT 170 from abnormality by cutting off the power supplied to the CRT monitor.

Likewise, when a vertical deflection circuit 130 is in an abnormal state, the monitor protection system operates to reliably protect the CRT monitor from the abnormality as follows. The vertical deflection circuit 130 applies a vertical deflection signal to the input terminal V1 of a vertical deflection detecting circuit 160. The vertical deflection detecting circuit 160 checks the vertical deflection signal input thereto and outputs an abnormal state detecting signal through an output terminal S4 thereof to the input terminal C2 of the control circuit 140. Subsequently, the control circuit 140 determines whether the abnormal state detecting signal is input and applies a control signal through a control signal such as a logic signal of a low level "0" to the output terminal C3 of a DPMS operating system 100, if the abnormal state detecting signal is input. The DPMS operating system 100 starts the DPMS operation upon receipt of the protection control signal. Therefore, the breakdown of the CRT and the vertical deflection circuit to be caused by surge currents is prevented, and the power supplied to the monitor is cut off to protect the CRT.

Figure 3:
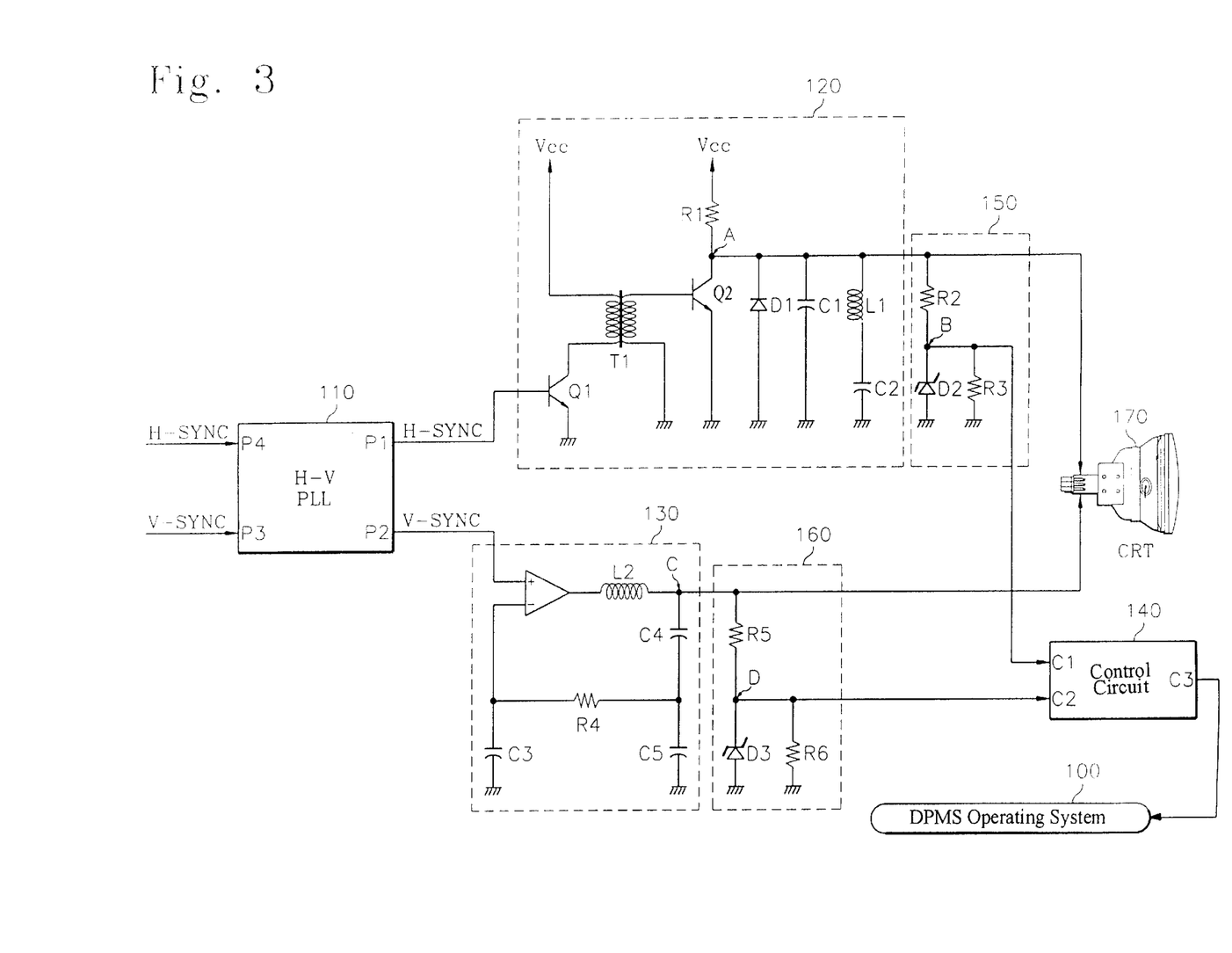
FIG. 3 is a detailed circuit diagram of the monitor protection system constructed according to the embodiment of the invention.

FIG. 3 illustrates a detailed circuit diagram of the monitor protection system of a CRT monitor constructed according to the present invention. As shown in FIG. 3, the horizontal deflection circuit 120 is constructed of a pair of transistors Q1, Q2, a transformer T1 and a series of resistor R1, diode D1, capacitors C1, C2 and inductance L1. The vertical deflection circuit 130 is constructed of a comparator COM and a series of inductance L2, resistor R4, and capacitors C3, C4 and C5.

The horizontal synchronization signal from the horizontal/vertical PLL 110 is applied to the base of a transistor Q1 in the horizontal deflection circuit 120 to switch the transistor Q1. The transistor Q1 amplifies the horizontal synchronization signal to apply it through a transformer T1 to a transistor Q2. At that time, the horizontal synchronization signal becomes a high-voltage of an appropriate level to turn on the transistor Q2. Diode D1 has a damper function to cut off a reverse voltage. The transistor Q2 again amplifies the horizontal synchronization signal and then applies it to a horizontal deflection coil L1 to generate a horizontal deflection signal of a saw tooth wave form. The horizontal deflection coil L1 supplies the horizontal deflection signal to a CRT 170 directly, to control the CRT 170. The horizontal deflection signal has a voltage wave the same as that of FIG. 4A and the maximum voltage of 1000 Volt. Similarly, the vertical synchronization signal from the horizontal/vertical PLL 10 is applied to the vertical deflection circuit 30 to control the vertical deflection operation of the CRT 40.

The vertical synchronization signal from the horizontal/vertical PLL 110 is applied to an operational amplifier A1 of a vertical deflection circuit 130 to be amplified and then supplied to a vertical deflection coil L2 to generate a vertical deflection signal of a high voltage pulse. The vertical deflection signal is fed back through a capacitor C4 and a resistor R4 to the inverting terminal of the operational amplifier A1, while the vertical deflection signal is integrated by the capacitors C4 and C5 and then supplied to the CRT 170, directly. The vertical deflection signal is the same as that of FIG. 5C, and the maximum voltage is about 60 Volt.

The horizontal and vertical deflection detecting circuits 150 and 160 are each constructed of a series of resistors R2, R3 and R5, R6 and diodes D2, D3 connected in parallel to the output terminals of the horizontal deflection circuit 120 and the vertical deflection circuit 130, respectively. The operation of the horizontal and vertical deflection detecting circuits 150 and 160 are now described in detail with reference to FIGS. 3, 4A–4B and 5A–5B hereinbelow.

Figure 4A:
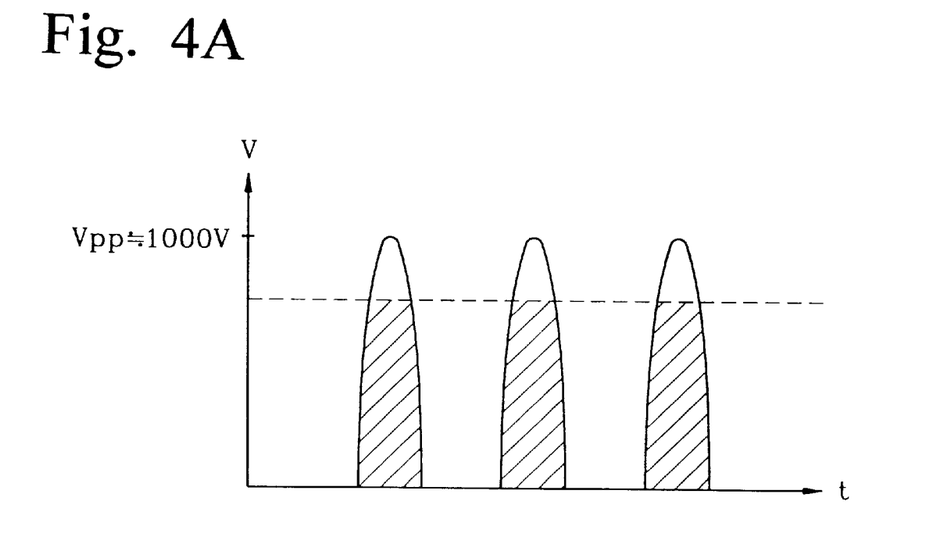
FIGS. 4A and 4B are waveforms of output signals from the branch points "A" and "B" of a horizontal deflection circuit and a horizontal deflection detecting circuit according to the embodiment of the invention.
Figure 4B:
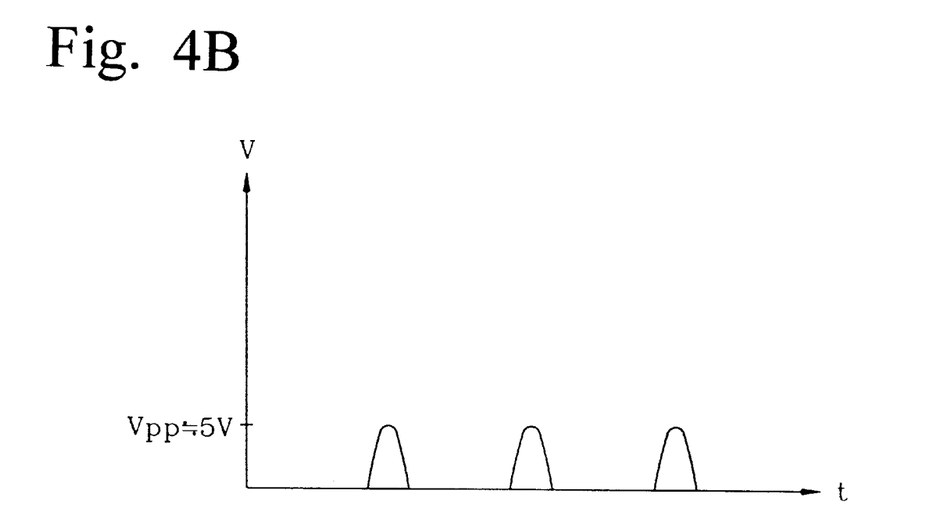

In the horizontal deflection detecting circuit 150, a resistor R2 is connected at one terminal to the outputting terminal A of the horizontal deflection circuit 120 to force the horizontal deflection signal to be divided into first voltage, for example about 1000 Volt, as indicated in FIG. 4A. A resistor R3 is connected between the other terminal of the resistor R2 and a ground to force the horizontal deflection signal to be into second voltage, for example 5 Volt. A horizontal zener diode D2 is connected at one terminal between the resistors R2 and R3 and grounded at other terminal to force the second voltage to be maintained at a predetermined voltage, for example 5 Volt. The horizontal deflection detecting signal is applied to the horizontal deflection detecting inputting terminal C3 of the control circuit 140. At that time, the horizontal deflection detecting signal becomes a pulse of maximum 5 Volt as indicated in FIG. 4B.

Figure 5A:
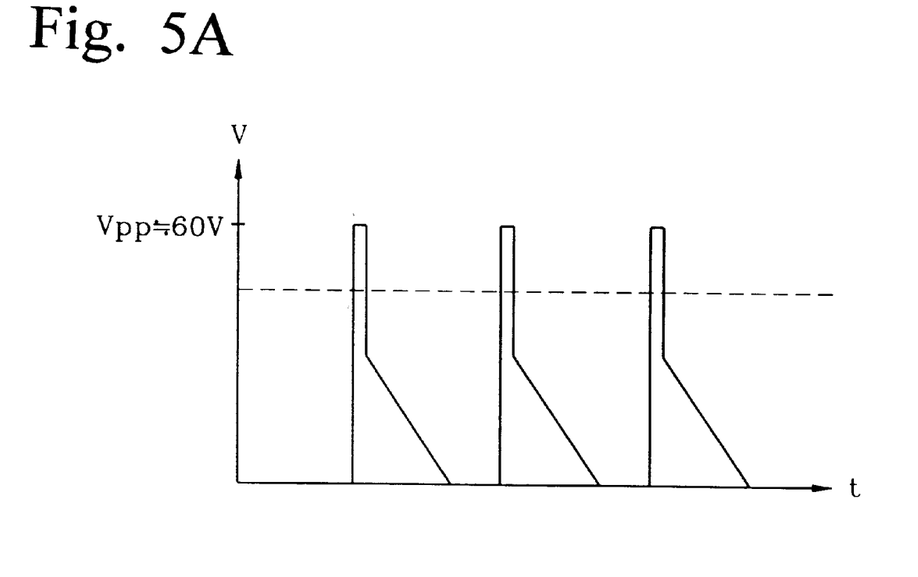
FIGS. 5A and 5B are waveforms of output signals from the branch points "C" and "D" of a vertical deflection circuit and a vertical deflection detecting circuit according to the embodiment of the invention.
Figure 5B:
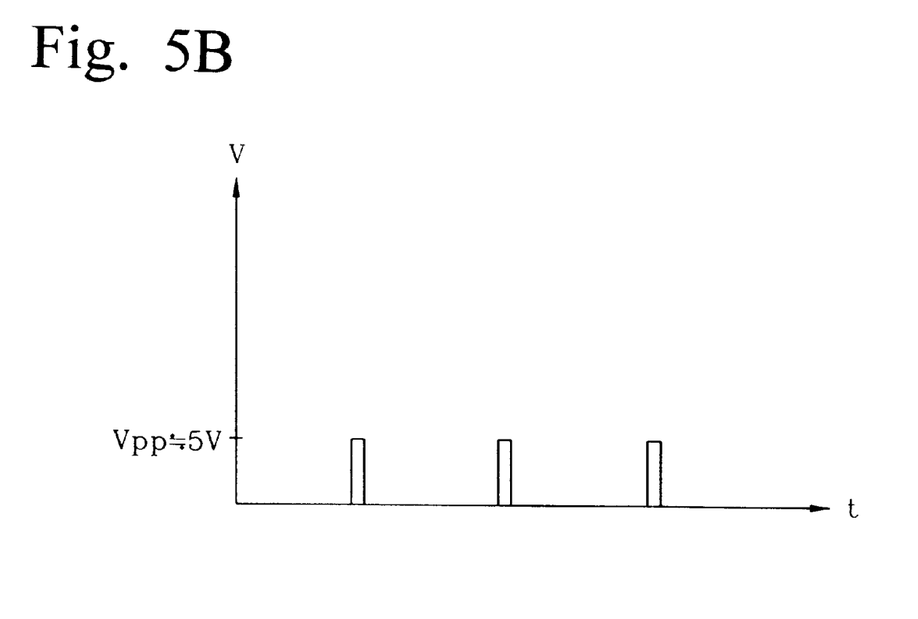

In the vertical deflection detecting circuit 130, a resistor R5 is connected at one terminal to the output terminal C of the vertical deflection circuit 130 to force the vertical deflection signal to be divided into first voltage, for example about 60 Volt, as indicated in FIG. 5A. A resistor 6 is connected between the other terminal of the resistor R5 and a ground to force the vertical deflection signal to be into second voltage, for example 5 Volt, as indicated in FIG. 5B. A vertical zener diode D3 is connected at one terminal between the resistors R5 and R6 and grounded at other terminal to force the second voltage to be maintained at a predetermined voltage, for example 5 Volt. At that time, the vertical deflection detecting signal becomes a pulse of maximum 5 Volt as indicated in FIG. 5B.

Figure 6:
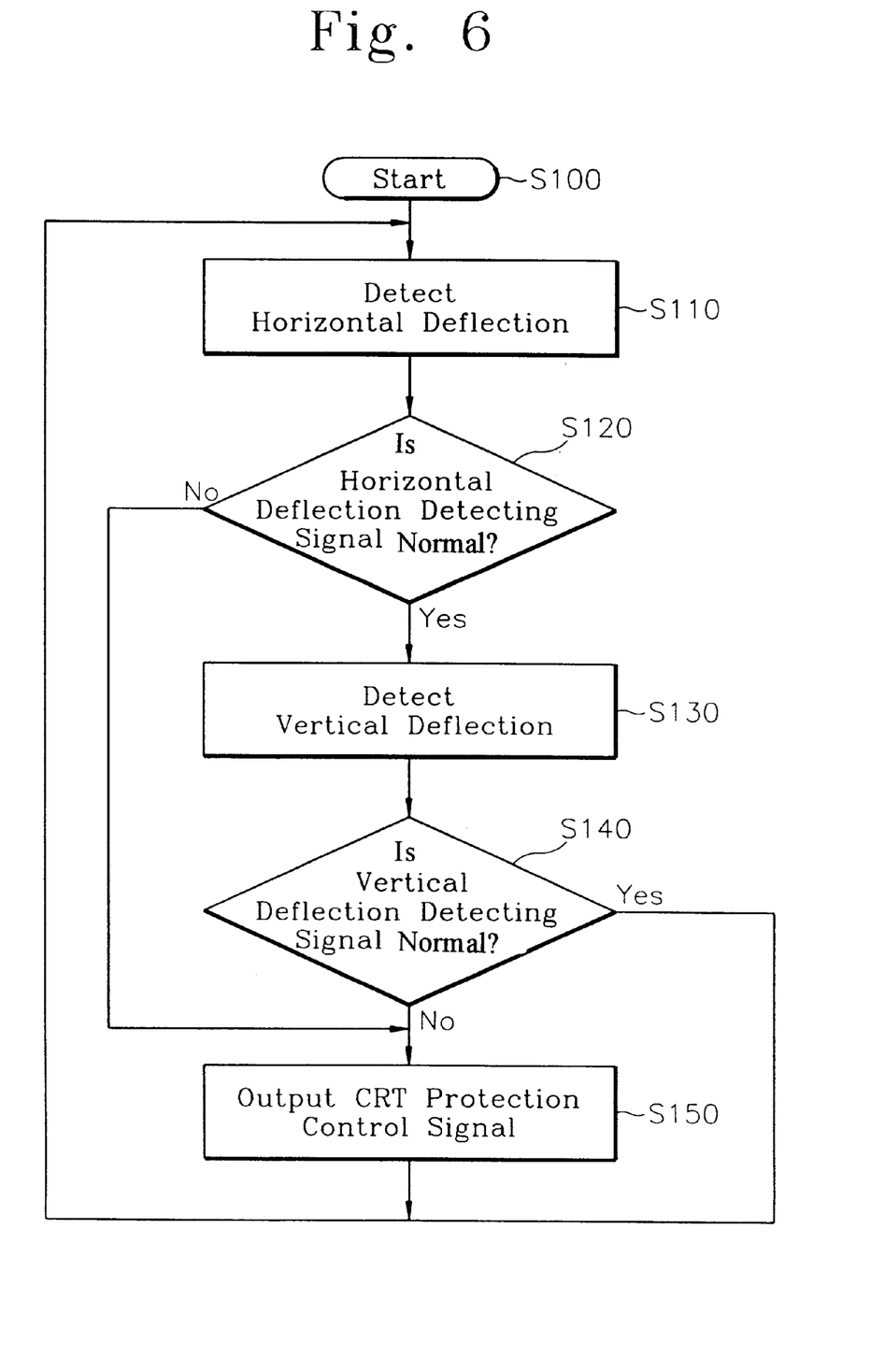
FIG. 6 is a flow chart of a control process of the monitor protection system according to the embodiment of the invention.

Refer now to FIG. 6, the control circuit 140 controls the system to protect a CRT 170 through a series of steps as described as follows. The control circuit 140 first detects a horizontal deflection detecting signal from the horizontal deflection detecting circuit 150 at step S110. The control circuit 140 then determines whether the horizontal deflection detecting signal is normal or not at step S120. If the abnormal state signal is detected, the control circuit proceeds to step S150 to output a CRT protection control signal to run a DPMS operating system 100. The DPMS operating system 100 then cuts off the power to be supplied to the CRT 170 in order to protect the CRT 170 from abnormality.

Next, if the vertical deflection circuit 130 is abnormally operated or receives the vertical synchronization signal that exceeds an allowable level, the control circuit 140 reads a vertical deflection detecting signal from the vertical deflection detecting circuit 130 at step S130, and then determines whether the vertical deflection detecting signal is normal or not at step S140. If the vertical deflection detecting signal is abnormal, the control circuit 140 proceeds to step 150 to output a CRT protection control signal to run a DPMS operating system 100. The DPMS operating portion 100 cuts off the power to be supplied to the CRT 170 in order to protect the same from abnormality.

As described above, the monitor protection system of the present invention determines the malfunction of deflection circuits and a flyback pulse generator, and checks the input of horizontal/vertical synchronization signals and the frequency of a flyback, thereby enabling the various protection of a system. The invention detects the abnormal state of deflection signals to prevent the breakdown of a CRT monitor.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A monitor protection system for protecting operation of a cathode-ray tube (CRT) type of monitor, comprising:

means for receiving horizontal and vertical synchronization signals;

a horizontal deflection circuit for generating a horizontal deflection signal to control a horizontal deflection operation of the monitor based upon the horizontal synchronization signal;

a vertical deflection circuit for generating a vertical deflection signal to control a vertical deflection operation of the monitor based upon the vertical synchronization signal;

a display power management system for controlling power supply to the monitor;

a horizontal deflection detecting circuit for detecting the horizontal deflection signal generated from the horizontal deflection circuit;

a vertical deflection detecting circuit for detecting the vertical deflection signal generated from the vertical deflection circuit; and a control circuit for determining whether the horizontal deflection signal and the vertical deflection signal are normal, and generating a protection control signal to control operation of the display power management system.

2. The monitor protection system of claim 1, further comprised of said horizontal deflection detecting circuit comprising:

a first voltage resistor connected to an output terminal of the horizontal deflection circuit to force the horizontal deflection signal to be divided into a first voltage;

a second voltage resistor connected between the first voltage resistor and ground to force the horizontal deflection signal to be divided into a second voltage; and a horizontal Zener diode connected between the first and second voltage resistors and ground to force the second voltage to be maintained at a predetermined voltage.

3. The monitor protection system of claim 2, further comprised of an output signal divided by the first and second voltage resistors being applied to a horizontal deflection detecting terminal of the control circuit for detecting whether the horizontal deflection signal is normal.

4. The monitor protection system of claim 2, further comprised of the first and second voltage resistors being set to force the horizontal deflection signal to be divided into 5 volts.

5. The monitor protection system of claim 1, further comprised of said vertical deflection detecting circuit comprising:

a first voltage resistor connected to an output terminal of the vertical deflection circuit to force the vertical deflection signal to be divided into a first voltage;

a second voltage resistor connected between the first voltage resistor and ground to force the vertical deflection signal to be into a second voltage; and a vertical Zener diode connected between the first and second voltage resistors and ground to force the second voltage to be maintained at a predetermined voltage.

6. The monitor protection system of claim 4, further comprised of the vertical deflection detecting circuit comprising:

a third voltage resistor connected to an output terminal of the vertical deflection circuit to force the vertical deflection signal to be divided into a third voltage;

a fourth voltage resistor connected between the first voltage resistor and ground to force the vertical deflection signal to be into a fourth voltage; and a vertical Zener diode connected between the third and fourth voltage resistors and ground to force the fourth voltage to be maintained at a second predetermined voltage.

7. The monitor protection system of claim 1, further comprised of said horizontal deflection circuit comprising:

a first transistor having a first electrode of a principle electrically conducting channel coupled to a power source via a transformer, a second electrode of said principle electrically conducting channel coupled to ground, and a control electrode coupled to receive said horizontal synchronization signal;

a second transistor having a first electrode of a principle electrically conducting channel coupled to said power source via a resistor, a second electrode of said principle electrically conducting channel coupled to said ground, and a control electrode connected to the first electrode of said first transistor via said transformer; and a diode, a first capacitor and a series of inductance and a second capacitor each connected in parallel to the first electrode of said second transistor serving as an output terminal for generating said horizontal deflection signal.

8. The monitor protection system of claim 7, further comprised of said horizontal deflection detecting circuit comprising:

a first voltage resistor connected to an output terminal of the horizontal deflection circuit to force the horizontal deflection signal to be divided into a first voltage;

a second voltage resistor connected between the first voltage resistor and ground to force the horizontal deflection signal to be divided into a second voltage; and a horizontal Zener diode connected between the first and second voltage resistors and ground to force the second voltage to be maintained at a predetermined voltage.

9. The monitor protection system of claim 1, further comprised of said vertical deflection circuit comprising:

a comparator having a first input terminal coupled to receive said vertical synchronization signal and a second input terminal connected to ground via a first capacitor;

an inductor connected between an output of said comparator and an output terminal of said vertical deflection circuit;

a series of second and third capacitors connected in between said output terminal of said vertical deflection circuit and ground; and a resistor connected between the first and third capacitors.

10. The monitor protection system of claim 9, further comprised of said vertical deflection detecting circuit comprising:

a first voltage resistor connected to said output terminal of the vertical deflection circuit to force the vertical deflection signal to be divided into a first voltage;

a second voltage resistor connected between the first voltage resistor and ground to force the vertical deflection signal to be into a second voltage; and a vertical Zener diode connected between the first and second voltage resistors and ground to force the second voltage to be maintained at a predetermined voltage.

11. The monitor protection system of claim 1, further comprised of said control circuit generating said protection control signal to control operation of the display power management system by:

reading the horizontal deflection signal generated from the horizontal deflection detecting circuit;

determining whether the horizontal deflection signal is normal;

reading the vertical deflection signal generated from the vertical deflection detecting circuit;

determining whether the vertical deflection signal is normal; and generating said protection control signal to force the display power management operation system to protect operation of the monitor.

12. A control method of a monitor protection system comprising steps of:

receiving a horizontal deflection signal generated from a horizontal deflection detecting circuit;

determining whether the horizontal deflection detecting signal is normal;

reading a vertical deflection signal from a vertical deflection detecting circuit;

determining whether the vertical deflection detecting signal is normal; and generating a protection control signal to force a display power management system to protect of a CRT monitor from abnormality.

13. A monitor protection system for protecting operation of a cathode-ray tube (CRT) type of monitor, said monitor protection system comprising:

a horizontal deflection circuit for generating a horizontal deflection signal to control a horizontal deflection operation of the monitor in response to a received horizontal synchronization signal;

a vertical deflection circuit for generating a vertical deflection signal to control a vertical deflection operation of the monitor in response to a received vertical synchronization signal;

a display power management system for controlling power supply to the monitor;

a horizontal deflection detecting circuit for detecting the horizontal deflection signal generated by the horizontal deflection circuit, outputting said horizontal deflection signal to said monitor and outputting a first divided signal by dividing said horizontal deflection signal;

a vertical deflection detecting circuit for detecting the vertical deflection signal generated by the vertical deflection circuit, outputting said vertical deflection signal to said monitor and outputting a second divided signal by dividing said vertical deflection signal; and a control circuit for receiving said first and second divided signals to determine whether the horizontal deflection signal and the vertical deflection signal are normal, wherein said control circuit generates a protection control signal to control operation of the display power management system when it is determined that one of said horizontal deflection signal and said vertical deflection signal are not normal.

14. The monitor protection system as set forth in claim 13, wherein said horizontal deflection detecting circuit comprises:

a first resistor having a first terminal and a second terminal, said first terminal being connected to an output terminal of said horizontal deflection circuit and said second terminal being connected to a node;

a second resistor connected between said node and a ground terminal, said first and second resistors forming a voltage divider for dividing said horizontal deflection signal to generate said first divided signal at said node; and a Zener diode connected between the said node and said ground terminal to maintain said first divided signal at a predetermined voltage level.

15. The monitor protection system as set forth in claim 13, wherein said vertical deflection detecting circuit comprises:

a first resistor having a first terminal and a second terminal, said first terminal being connected to an output terminal of said vertical deflection circuit and said second terminal being connected to a node;

a second resistor connected between said node and a ground terminal, said first and second resistors forming a voltage divider for dividing said vertical deflection signal to generate said second divided signal at said node; and a Zener diode connected between the said node and said ground terminal to maintain said second divided signal at a predetermined voltage level.

* * * * *